United States Patent
Kang et al.

(10) Patent No.: US 8,761,304 B2
(45) Date of Patent: Jun. 24, 2014

(54) APPARATUS AND METHOD FOR PROCESSING DIGITAL TRANSMISSION/RECEPTION SIGNALS TO CORRECT IN-BAND GAIN FLATNESS

(75) Inventors: Min Soo Kang, Daejeon (KR); Woo Jin Byun, Daejeon (KR); Kwang Seon Kim, Daejeon (KR); Bong-Su Kim, Daejeon (KR); Myung Sun Song, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 546 days.

(21) Appl. No.: 12/882,833

(22) Filed: Sep. 15, 2010

(65) Prior Publication Data

US 2011/0150131 A1 Jun. 23, 2011

(30) Foreign Application Priority Data

Dec. 17, 2009 (KR) .................. 10-2009-0125847
Feb. 2, 2010 (KR) .................. 10-2010-0009399

(51) Int. Cl.
*H04K 1/02* (2006.01)
*H04L 25/49* (2006.01)

(52) U.S. Cl.
USPC ............ 375/296; 375/285; 375/295; 375/350

(58) Field of Classification Search
USPC .......... 375/295, 296, 297, 285, 350, 232–233
See application file for complete search history.

(56) References Cited

U.S. PATENT DOCUMENTS

| | | | |
|---|---|---|---|
| 5,930,299 A * | 7/1999 | Vannatta et al. | 375/269 |
| 7,436,915 B2 * | 10/2008 | Kang et al. | 375/350 |
| 2003/0043894 A1 | 3/2003 | Sestok et al. | |
| 2008/0310489 A1 | 12/2008 | Ichiyama et al. | |
| 2009/0141828 A1 * | 6/2009 | Huang et al. | 375/296 |

FOREIGN PATENT DOCUMENTS

| | | |
|---|---|---|
| EP | 1089513 A1 | 4/2001 |
| KR | 2005-0034472 A | 4/2005 |
| KR | 10-20090081086 A | 11/2006 |
| KR | 2007-0094315 A | 9/2007 |
| KR | 1020060116828 A | 7/2009 |

* cited by examiner

*Primary Examiner* — Qutbuddin Ghulamali
(74) *Attorney, Agent, or Firm* — Rabin & Berdo, P.C.

(57) ABSTRACT

An apparatus for processing a digital transmission signal for a transmitter includes a transmission Finite Impulse Response (FIR) filter to perform shaping on initial setting data to convert the initial setting data into a signal having a predetermined passband, a comparator to compare the signal with data including degradation information provided as feedback by a receiver corresponding to the transmitter, to generate a control signal, and a band flatness correction filter to adjust a coefficient of the band flatness correction filter in response to the control signal, and to correct an in-band flatness.

4 Claims, 8 Drawing Sheets

APPARATUS AND METHOD FOR PROCESSING DIGITAL TRANSMISSION/RECEPTION SIGNALS TO CORRECT IN-BAND GAIN FLATNESS

CROSS-REFERENCE TO RELATED APPLICATIONS

This application claims the benefit of Korean Patent Application No. 10-2009-0125847 and of Korean Patent Application No. 10-2010-0009399, respectively filed on Dec. 17, 2009 and Feb. 2, 2010, in the Korean Intellectual Property Office, the disclosures of which are incorporated herein by reference.

BACKGROUND

1. Field of the Invention

The present invention relates to a transmitting apparatus, a receiving apparatus, and a method, and more particularly, to an apparatus and method for processing a digital transmission signal and a digital reception signal to correct an in-band gain flatness in a point-to-point communication system.

2. Description of the Related Art

Current communication systems are being developed in a way to transmit a greater amount of information, which requires a wider frequency band. Additionally, the communication systems increasingly adopt a modulation scheme with a higher frequency efficiency, for example a Quadrature Phase Shift Keying (QPSK) modulation scheme, an 8-Phase-shift Keying (PSK) modulation scheme, a 16 Quadrature Amplitude Modulation (QAM) scheme, instead of a conventional On-Off Keying (OOK) scheme used as a simple modulation scheme.

As a used frequency band becomes wider, it becomes increasingly difficult to maintain a constant in-band flatness in conventional communication systems using a high modulation scheme.

To solve the above problem, an equalizer is being used to correct the in-band flatness in the conventional communication systems. Typically, the equalizer may be used in a Digital Signal Processor (DSP) block of a receiver.

Figure 1:
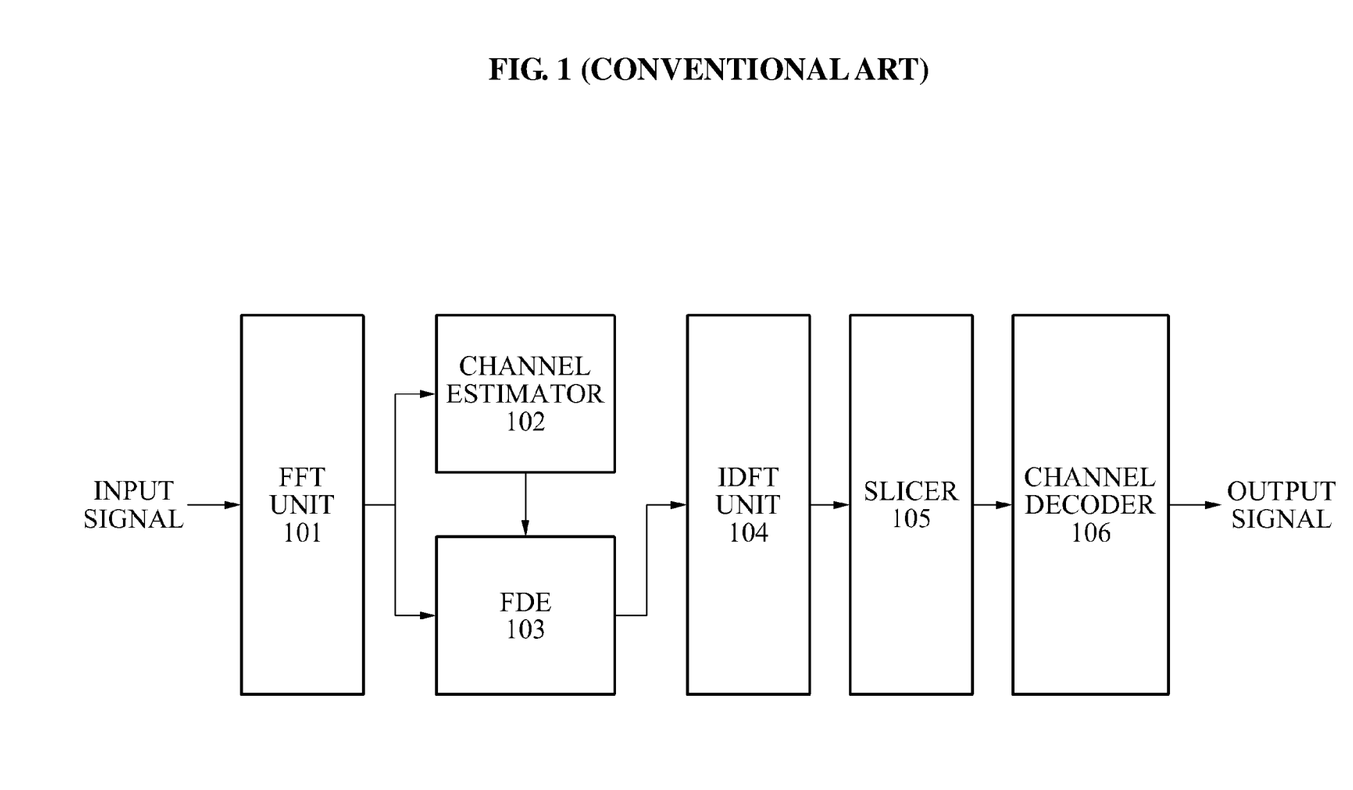
FIG. 1 is a diagram illustrating a frequency domain equalizer used in a conventional receiver.

FIG. 1 is a diagram illustrating a frequency domain equalizer that is used in a conventional receiver.

Referring to FIG. 1, a signal received via an antenna may be converted into a baseband signal through a Radio Frequency (RF)/Intermediate Frequency (IF) circuit, and the baseband signal may be converted into a digital signal through an Analog-to-Digital Converter (ADC).

The digital signal into which the baseband signal is converted may be applied to a DSP module. The signal applied to the DSP module may be converted from a time domain signal to a frequency domain signal by passing through a Fast Fourier Transform (FFT) unit 101. The converted signal may be applied to a channel estimator 102 and a Frequency Domain Equalizer (FDE) 103.

The channel estimator 102 may estimate, based on the applied signal, an in-band flatness degradation signal that is generated while passing through a channel, and may apply the estimated signal to the FDE 103.

The FDE 103 may compare the signal applied to the FFT unit 101 with the signal applied to the channel estimator 102, and may apply a signal for correcting a difference between the two signals to an Inverse Discrete Fourier Transform (IDFT) unit 104.

The IDFT unit 104 may convert the corrected signal into a time domain signal, and may apply the converted time domain signal to a channel decoder 106. Here, the converted time domain signal may be sliced by a slicer 105, and may be applied to the channel decoder 106.

When an amount of information to be transferred by the equalizer of the general receiver is increased as described above, a required baseband frequency may be widened. In other words, a very fast FFT operation may be required.

However, in current systems having gigabit per second (Gbps) level communication similar to a millimeter wave band, it is very difficult to achieve the fast FFT operation even using a device technology enabling a high-speed operation, for example a field programmable gate array (FPGA).

SUMMARY

An aspect of the present invention is to extract all degradation components, namely, distortion components of an in-band flatness that are generated in a transmitter and a receiver, and to improve an in-band gain flatness, when a point-to-point communication is performed in a millimeter wave band.

Another aspect of the present invention is to provide a transmitting apparatus, a receiving apparatus, and a method that may transfer in-band gain degradation information obtained by a receiver using an existing data communication path, and may correct an in-band gain flatness, without incurring additional costs for a separate transfer path.

According to an aspect of the present invention, there is provided an apparatus for processing a digital transmission signal for a transmitter, the apparatus including a transmission Finite Impulse Response (FIR) filter to perform shaping on initial setting data to convert the initial setting data into a signal having a predetermined passband; a comparator to compare the signal with data, to generate a control signal, the data including degradation information provided as feedback by a receiver corresponding to the transmitter; and a band flatness correction filter to adjust a coefficient of the band flatness correction filter in response to the control signal, and to correct an in-band flatness.

According to another aspect of the present invention, there is provided an apparatus for processing a digital transmission signal for a transmitter, the apparatus including a comparator to compare initial setting data with data, to generate a control signal, the data including degradation information provided as feedback by a receiver corresponding to the transmitter; and a band flatness correction filter to adjust a coefficient in response to the control signal, and to correct an in-band flatness, the coefficient being related to filtering of the initial setting data.

According to still another aspect of the present invention, there is provided an apparatus for processing a digital reception signal for a receiver, the apparatus including: a reception FIR filter to perform time-based sampling on data, the data being received from a transmitter; and a data generator to generate data based on the sampled data, the generated data including degradation information between the receiver and the transmitter.

According to a further aspect of the present invention, there is provided a method of processing a digital transmission signal for a transmitter, the method including performing shaping on initial setting data to convert the initial setting data into a signal having a predetermined passband; comparing the signal with data, to generate a control signal, the data including degradation information provided as feedback by a receiver corresponding to the transmitter; and adjusting a coefficient of a correction filter in response to the control signal, and correcting an in-band flatness.

According to a further aspect of the present invention, there is provided a method of processing a digital transmission signal for a transmitter, the method including comparing initial setting data with data, to generate a control signal, the data including degradation information provided as feedback by a receiver corresponding to the transmitter; and adjusting a coefficient in response to the control signal, and correcting an in-band flatness, the coefficient being related to filtering of the initial setting data.

According to a further aspect of the present invention, there is provided a method for processing a digital reception signal for a receiver, the method including performing time-based sampling on data, the data being received from a transmitter; and generating data based on the sampled data, the generated data comprising degradation information generated between the receiver and the transmitter.

EFFECT

According to embodiments of the present invention, it is possible to improve an in-band gain flatness using Finite Impulse Response (FIR) filters respectively located in a transmitter and a receiver in an existing system, and to relax a standard for an in-band flatness when implementing a Radio Frequency (RF)/Intermediate Frequency (IF) circuit, so that the entire communication system may be implemented with lower costs.

Additionally, according embodiments of the present invention, it is possible to maintain a superior communication quality by improving an in-band gain flatness.

Furthermore, according embodiments of the present invention, it is possible to achieve continuous control by forming a feedback loop between a transmitting apparatus and a receiving apparatus, and it is also possible to easily deal with a change in an RF/IF circuit based on time.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 2:
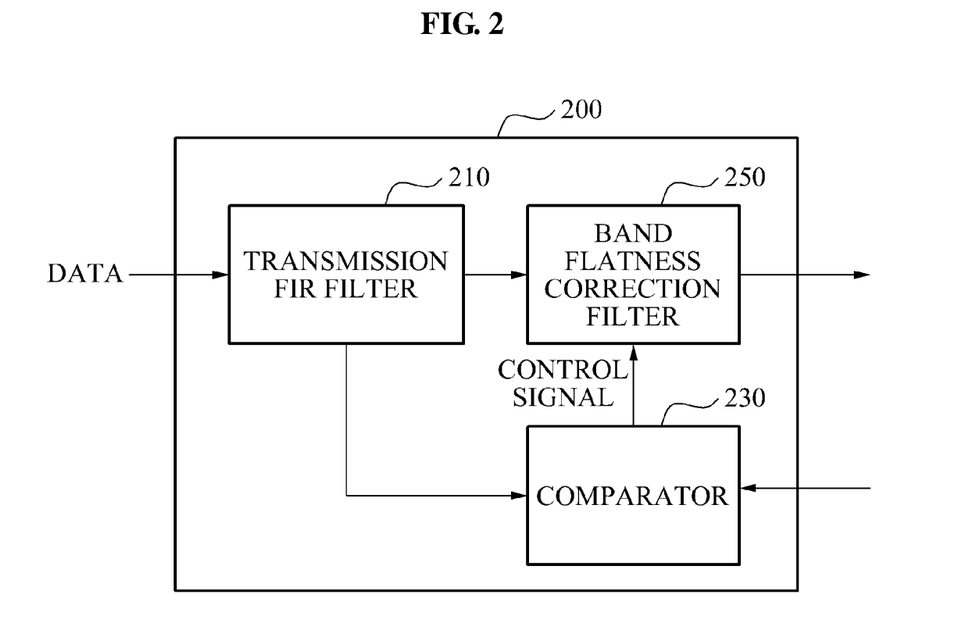
FIG. 2 is a block diagram illustrating a digital transmission signal processing apparatus according to an embodiment of the present invention.

FIG. 2 is a block diagram illustrating a digital transmission signal processing apparatus 200 according to an embodiment of the present invention. Referring to FIG. 2, the digital transmission signal processing apparatus 200 includes a transmission Finite Impulse Response (FIR) filter 210, a comparator 230, and a band flatness correction filter 250.

The transmission FIR filter 210 may perform shaping on initial setting data, to convert the initial setting data into a signal having a predetermined passband. Here, the initial setting data may be data that is known in advance, and the signal into which the initial setting data is converted may be provided to both the comparator 230 and the band flatness correction filter 250, to be compared with data including degradation information on a degradation or distortion occurring while passing through a feedback loop formed between a transmitter and a receiver.

The comparator 230 may compare the signal into which the initial setting data is converted by the transmission FIR filter 210 with data including degradation information provided as feedback by the receiver corresponding to the transmitter, in order to generate a control signal to be provided to the band flatness correction filter 250. A configuration for generating a control signal in the comparator 230 will be described below with reference to FIG. 5.

The digital transmission signal processing apparatus 200 may form a feedback loop connecting from the transmitter to the receiver, and may correct an in-band gain flatness. Here, the feedback loop may be used to measure the in-band gain flatness in a point-to-point communication system using a millimeter wave.

Accordingly, characteristics of the in-band gain flatness that are degraded or distorted when a baseband signal is changed to an Intermediate Frequency (IF) signal or a Radio Frequency (RF) signal through the feedback loop may be contained in the data including the degradation information provided as feedback by the receiver.

The band flatness correction filter 250 may adjust a coefficient of the band flatness correction filter in response to the generated control signal, and may correct an in-band flatness.

Figure 3:
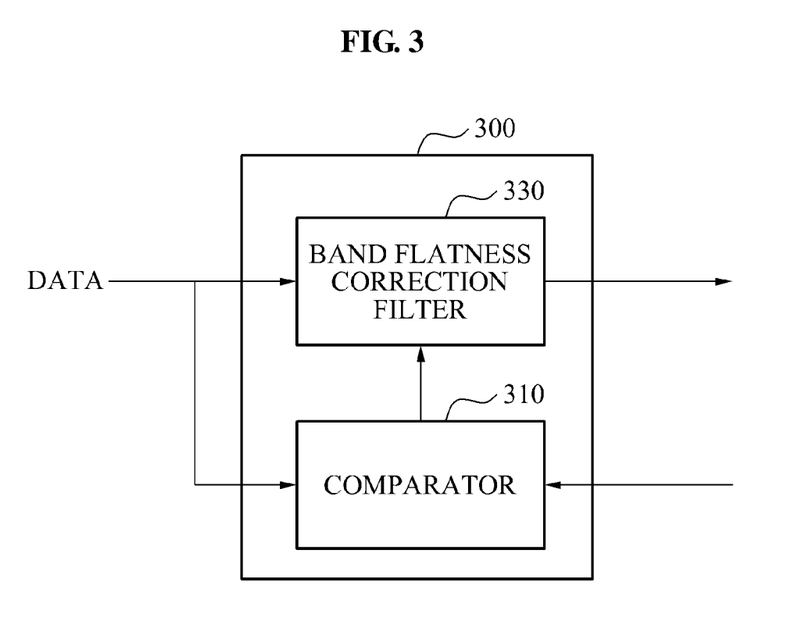
FIG. 3 is a block diagram illustrating a digital transmission signal processing apparatus according to another embodiment of the present invention.

FIG. 3 is a block diagram illustrating a digital transmission signal processing apparatus 300 according to another embodiment of the present invention. Referring to FIG. 3, the digital transmission signal processing apparatus 300 includes a comparator 310, and a band flatness correction filter 330.

The comparator 310 may compare initial setting data with data including degradation information provided as feedback by a receiver corresponding to a transmitter, to generate a control signal.

A configuration for generating a control signal in the comparator 310 will be also described below with reference to FIG. 5.

The band flatness correction filter 330 may adjust a coefficient related to filtering of the initial setting data, in response to the control signal generated by the comparator 310, and may correct an in-band flatness. Here, the coefficient may include, for example, a filtering coefficient of the band flatness correction filter 330.

Figure 4:
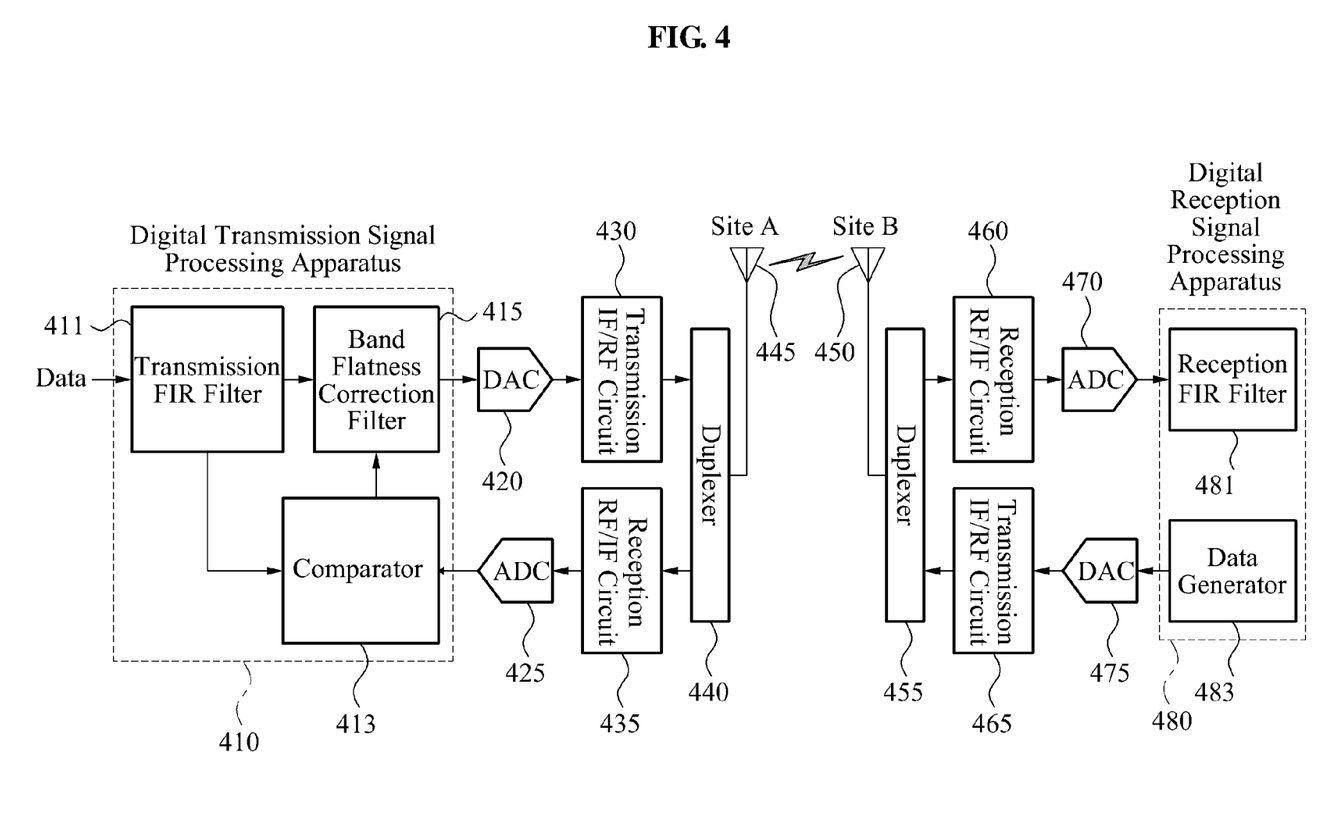
FIG. 4 is a diagram illustrating an in-band gain flatness correction system including a digital transmission signal processing apparatus and a digital reception signal processing apparatus according to an embodiment of the present invention.

FIG. 4 is a diagram illustrating an in-band gain flatness correction system including a digital transmission signal processing apparatus 410 and a digital reception signal processing apparatus 480 according to an embodiment of the present invention.

Since the in-band gain flatness correction system of FIG. 4 is in a Line Of Sight (LOS) environment where no significant amount of fading occurs in a millimeter wave band, a distinctiveness of a radio environment may be used in which a temporal characteristic of a channel between a transmission antenna and a reception antenna is based on merely a distance function, not a time function.

Referring to FIG. 4, the in-band gain flatness correction system includes an analog transceiver, the digital transmission signal processing apparatus 410, and the digital reception signal processing apparatus 480. The analog transceiver includes Digital-to-Analog Converters (DACs) 420 and 475, Analog-to-Digital Converters (ADC) 425 and 470, transmission IF/RF circuits 430 and 465, reception RF/IF circuits 435 and 460, duplexers 440 and 455, and antennas 445 and 450.

To correct the in-band gain flatness, when data known in advance is applied to the digital transmission signal processing apparatus 410, the data may be converted into an analog signal through the DAC 420.

The analog signal into which the data is converted by the DAC 420 may be radiated to the antenna 445 through the transmission IF/RF circuit 430 and the duplexer 440 in a site A, namely a transmitter side.

The radiated signal may be received by the antenna 450 in a site B, namely a receiver side, and may be converted to a baseband signal through the reception RF/IF circuit 460 in the site B.

The baseband signal may be converted into a digital signal through the ADC 470, and the digital signal may be transmitted to the digital reception signal processing apparatus 480.

The digital signal may be converted into time-based sampled data by passing through a reception FIR filter 481 of the digital reception signal processing apparatus 480.

The sampled data may include degradation information on a degradation or distortion of the in-band gain flatness that occurs while passing through the transmission IF/RF circuit 430 of the site A, a channel between the sites A and B, and the reception RF/IF circuit 460 of the site B.

The degradation information may be combined by a data generator 483, and may be modified to have a structure, for example a frame structure, that is suitable for being retransmitted to the transmitter.

Additionally, the degradation information may be transferred to a comparator 413 of the site A through a data transfer path, namely a feedback path. Here, the feedback path may enable data to be transferred as feedback from the site B to the site A.

In an embodiment of the present invention, in-band gain degradation information obtained by a receiver may be transferred through an existing data communication path and thus, it is possible to prevent costs for a separate transfer path from being further incurred.

The comparator 413 may compare a signal passing through a transmission FIR filter 411 with data including the degradation information received from the digital reception signal processing apparatus 480. Here, the signal may be initial setting data.

Hereinafter, an operation of an in-band gain flatness correction system in a millimeter wave band according to an embodiment of the present invention will be further described.

Initial setting data applied to the digital transmission signal processing apparatus 410 may be converted into a signal having a predetermined passband by a shaping operation of the transmission FIR filter 411. Here, the initial setting data may be a digital signal.

The signal into which the initial setting data is converted may be applied to the comparator 413 and a band flatness correction filter 415.

Here, the signal applied to the comparator 413 may be used as a reference signal to be compared with a signal provided as feedback by the digital reception signal processing apparatus 480. The signal provided as feedback may be data including degradation information.

The signal transferred to the DAC 420 through the flatness correction filter 415 may be converted into an analog signal, and the analog signal may be frequency-converted into an IF/RF signal through the transmission IF/RF circuit 430.

The IF/RF signal into which the analog signal is frequency-converted may be applied to the antenna 445 through the duplexer 440, and the signal applied to the antenna 445 may be radiated via a wireless channel. Here, the duplexer 440 may enable only a signal of a desired band to be transferred to the antenna 445.

In the site B, the radiated signal may be received to the antenna 450, and the received signal may be applied to the reception RF/IF circuit 460 through the duplexer 455. Here, the duplexer 455 may enable only a signal of a desired band to be passed.

The reception RF/IF circuit 460 may frequency-convert the received signal into a baseband signal, and the baseband signal may be converted into a digital signal through the ADC 470.

The digital signal may be applied to the reception FIR filter 481 of the digital reception signal processing apparatus 480, and may be filtered by the reception FIR filter 481. The filtered signal may be reapplied to the data generator 483.

The signal passing through the reception FIR filter 481 may contain in-band flatness degradation components that are generated while passing through the transmission IF/RF circuit 430, the reception RF/IF circuit 460, the duplexers 440 and 455, and the antennas 445 and 450.

The signal containing the in-band flatness degradation components may be converted into data including degradation information by passing through the data generator 483, and may be transferred as general data from the site B to the site A. The signal transferred to the site A may be compared with the signal applied to the transmission FIR filter 411 by the comparator 413 of the site A. A detailed operation of the comparator 413 is further described with reference to FIG. 5 below.

Figure 5:
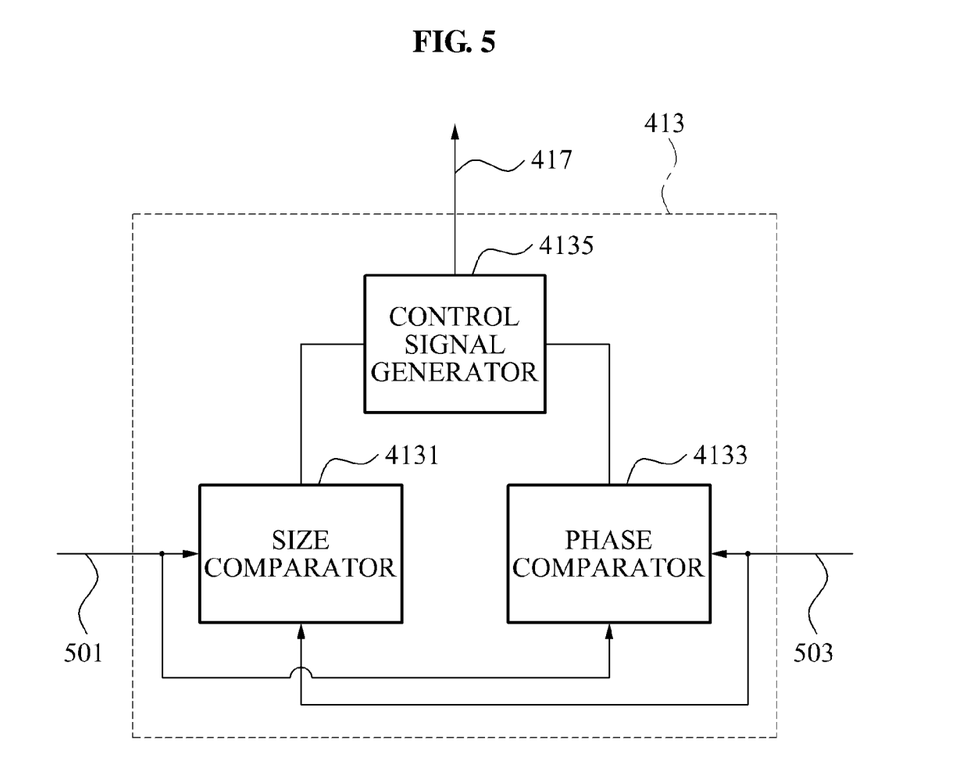
FIG. 5 is a diagram illustrating a comparator of FIG. 4 in further detail.

FIG. 5 is a diagram illustrating the comparator 413 of FIG. 4 in further detail.

As shown in FIG. 5, the comparator 413 includes a size comparator 4131, a phase comparator 4133, and a control signal generator 4135.

Referring to FIGS. 4 and 5, initial setting data 501 transferred from the transmission FIR filter 411 to the comparator 413 may be applied to the size comparator 4131 and the phase comparator 4133.

Data 503 may also be applied to the size comparator 4131 and the phase comparator 4133. The data 503 may include degradation information on a degradation of the in-band gain flatness that is provided as feedback from the site B through the feedback path.

The size comparator 4131 may calculate a size difference between a size of the initial setting data 501 and a size of the data 503.

The phase comparator 4133 may calculate a phase difference between a phase of the initial setting data 501 and a phase of the data 503. Here, the phase difference may occur in the feedback path, and may include, for example, a difference in phase values such as group delay values.

The control signal generator 4135 may generate a control signal 417 based on the size difference calculated by the size comparator 4131 and the phase difference calculated by the phase comparator 4133.

The control signal 417 generated by the control signal generator 4135 may be provided to the band flatness correction filter 415, and may be used to adjust a coefficient of the band flatness correction filter 415.

As described above, the comparator 413 may extract the degradation information of the in-band gain flatness, may adjust the coefficient of the band flatness correction filter 415 based on the extracted degradation information in response to the control signal 417, and may improve the in-band gain flatness.

Figure 6:
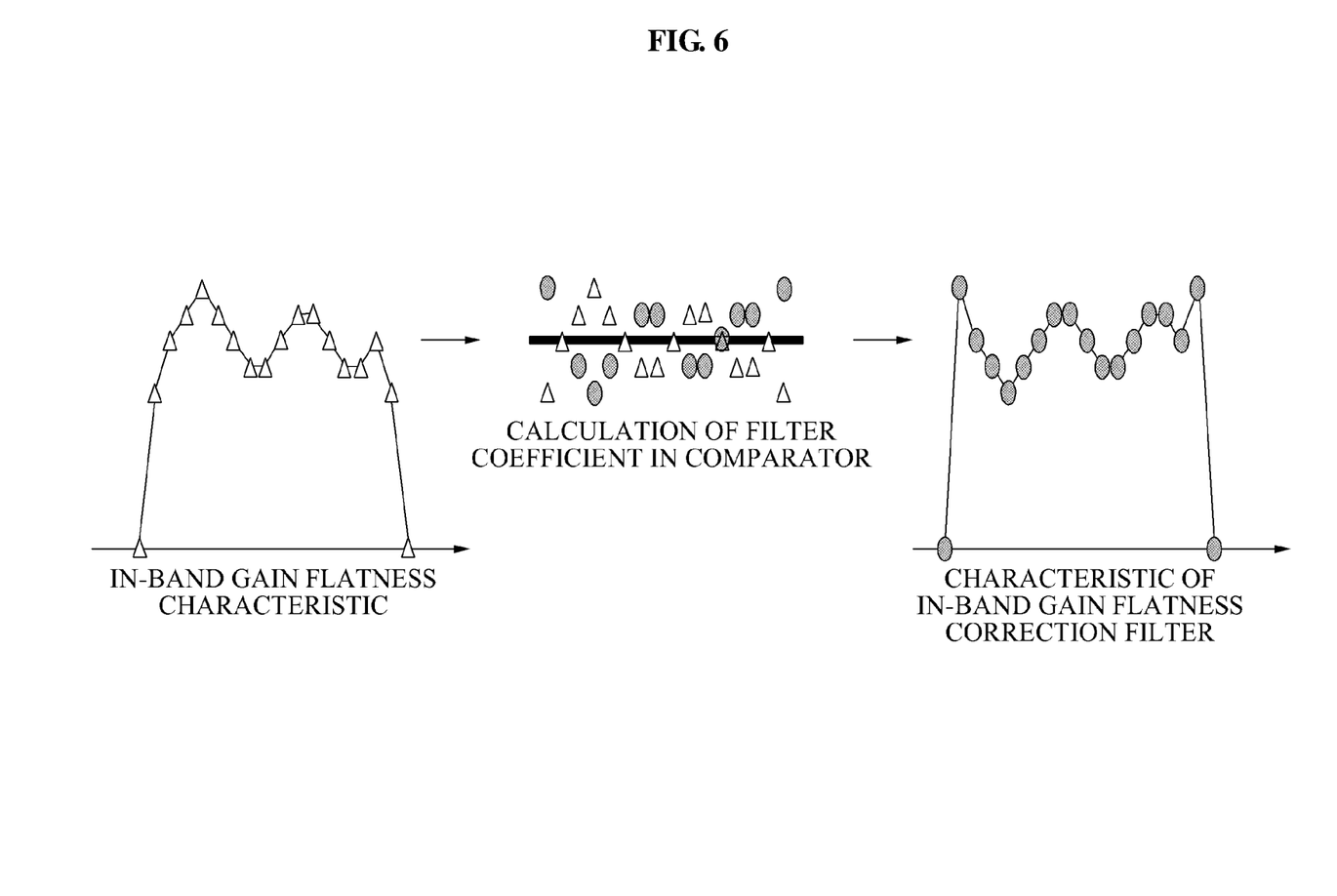
FIG. 6 is a diagram illustrating a concept of an operation of a band flatness correction filter according to an embodiment of the present invention.

A concept of an operation of a band flatness correction filter is briefly shown in FIG. 6.

FIG. 6 is a diagram illustrating a concept of an operation of a band flatness correction filter according to an embodiment of the present invention.

A control signal generated by a comparator may be used to adjust a coefficient of the band flatness correction filter, based on data including degradation information that is provided as feedback by a receiver through a feedback path.

The adjusted coefficient of the band flatness correction filter may be used to improve an in-band gain flatness characteristic based on initial setting data provided to the band flatness correction filter.

Figure 7:
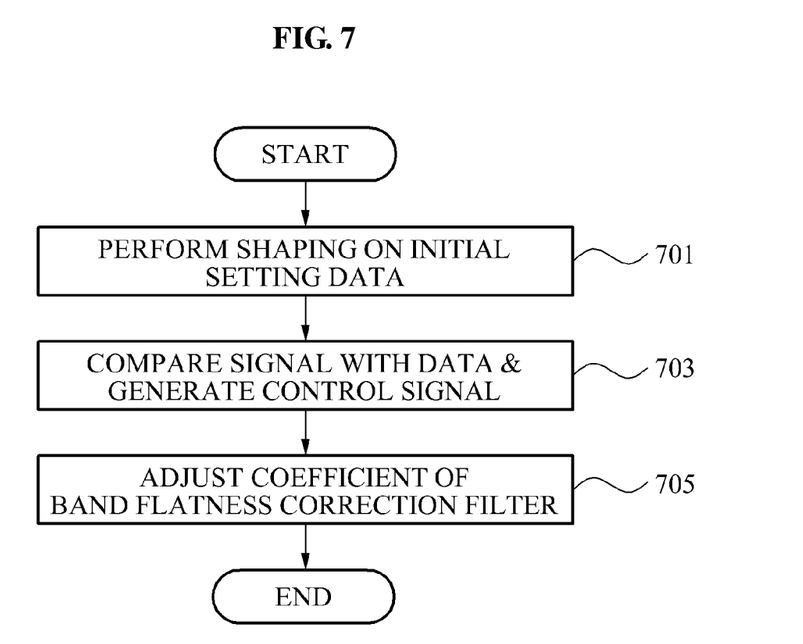
FIG. 7 is a flowchart illustrating a method of processing a digital transmission signal according to an embodiment of the present invention.

FIG. 7 is a flowchart illustrating a method of processing a digital transmission signal according to an embodiment of the present invention.

Referring to FIG. 7, when a transmission FIR filter performs shaping on initial setting data to convert the initial setting data into a signal having a predetermined passband, and transfers the signal to a band flatness correction filter and a comparator in operation 701, the comparator may compare the signal with data including degradation information provided as feedback by a receiver corresponding to a transmitter, to generate a control signal in operation 703.

Operation 703 may be classified into operations below, and the operations may be performed, for example, by a comparator.

In operation 703, a size difference between a size of the initial setting data and a size of the data including the degradation information may be calculated, and a phase difference between a phase of the initial setting data and a phase of the data including the degradation information may be calculated. Here, the size difference and the phase difference may be simultaneously or sequentially calculated.

Subsequently, a control signal may be generated based on the calculated size difference and the calculated phase difference, and the generated control signal may be provided to the band flatness correction filter.

In operation 705, the band flatness correction filter may adjust a coefficient of the band flatness correction filter in response to the control signal received from the comparator, so that the in-band flatness may be corrected, namely, improved.

For example, the shaping in operation 701, and the correcting of the in-band flatness in operation 705 may be performed by either the band flatness correction filter or a transmission FIR filter.

In this example, a digital transmission signal may be processed by the following scheme.

First, when a comparator compares initial setting data with data including degradation information provided as feedback by a receiver corresponding to a transmitter, to generate a control signal, either the band flatness correction filter or the transmission FIR filter may adjust a coefficient related to filtering of the initial setting data, in response to the control signal, and may correct an in-band flatness.

The comparing operation is identical to the comparing operation as described above in operation 703, and accordingly, further descriptions thereof will be omitted herein.

Figure 8:
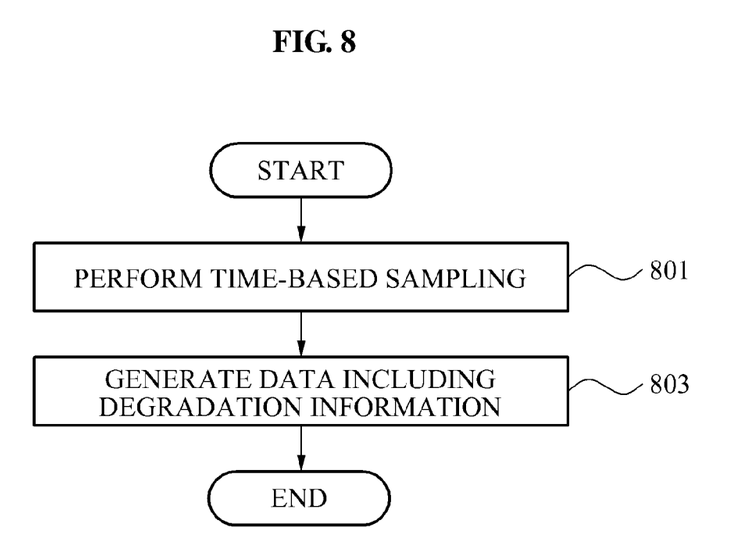
FIG. 8 is a flowchart illustrating a method of processing a digital reception signal according to an embodiment of the present invention.

FIG. 8 is a flowchart illustrating a method of processing a digital reception signal according to an embodiment of the present invention.

Referring to FIG. 8, to process the digital reception signal, a reception FIR filter may perform time-based sampling on data received from a transmitter in operation 801, and a data generator may generate data including degradation information between a receiver and the transmitter in operation 803.

Here, the data including the degradation information may include in-band flatness degradation components that are generated by passing through a transmission IF/RF circuit, a reception RF/IF circuit, a transmission duplexer, a reception duplexer, a transmission antenna, and a reception antenna that are located between a digital transmission signal processor of the transmitter and a digital reception signal processor of the receiver.

As described above, the methods described with reference to FIGS. 7 and 8 may include operations processed in a time series by the digital transmission signal processing apparatus and the digital reception signal processing apparatus that have been described above with reference to FIGS. 1 through 6.

In other words, although omitted here, descriptions regarding the digital transmission signal processing apparatus and the digital reception signal processing apparatus provided with reference to FIGS. 1 through 6 may be also applied to the methods of FIGS. 7 and 8.

The above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for processing a digital transmission signal for a transmitter, the apparatus comprising:
   a transmission Finite Impulse Response (FIR) filter to perform shaping on initial setting data to convert the initial setting data into a signal having a predetermined passband;
   a comparator to compare the signal with feedback data, the feedback data including degradation information received as feedback from a receiver corresponding to the transmitter, to thereby generate a control signal, the comparator including:
      a size comparator to calculate a size difference between a size of the initial setting data and a size of the feedback data,
      a phase comparator to calculate a phase difference between a phase of the initial setting data and a phase of the feedback data,
      a control signal generator to generate the control signal based on the size difference and the phase difference; and
   a band flatness correction filter to adjust a coefficient of the band flatness correction filter in response to the control signal, to correct an in-band flatness.

2. An apparatus for processing a digital transmission signal for a transmitter, the apparatus comprising:
   a comparator to compare initial setting data with feedback data, the feedback data including degradation information received as feedback from a receiver corresponding to the transmitter, to thereby generate a control signal, the comparator including:
      a size comparator to calculate a size difference between a size of the initial setting data and a size of the feedback data,
      a phase comparator to calculate a phase difference between a phase of the initial setting data and a phase of the feedback data,
      a control signal generator to generate the control signal based on the size difference and the phase difference; and
   a band flatness correction filter to adjust a coefficient in response to the control signal, to correct an in-band flatness, the coefficient being related to filtering of the initial setting data.

3. A method of processing a digital transmission signal for a transmitter, the method comprising:
   performing shaping on initial setting data to convert the initial setting data into a signal having a predetermined passband;
   comparing the signal with feedback data, the feedback data including degradation information received as feedback from a receiver corresponding to the transmitter, to thereby generate a control signal, the comparing including:
      calculating a size difference between a size of the initial setting data and a size of the feedback data,
      calculating a phase difference between a phase of the initial setting data and a phase of the feedback data,
      generating the control signal based on the size difference and the phase difference; and
   adjusting a coefficient of a correction filter in response to the control signal, and correcting an in-band flatness.

4. A method of processing a digital transmission signal for a transmitter, the method comprising:
   comparing initial setting data with feedback data, the feedback data including degradation information received as feedback from a receiver corresponding to the transmitter, to thereby generate a control signal, the comparing including:
      calculating a size difference between a size of the initial setting data and a size of the feedback data,
      calculating a phase difference between a phase of the initial setting data and a phase of the feedback data,
      generating the control signal based on the size difference and the phase difference; and
   adjusting a coefficient in response to the control signal, and correcting an in-band flatness, the coefficient being related to filtering of the initial setting data.

* * * * *